3,798,248
Patented Mar. 19, 1974

3,798,248
ARYL COPPER COMPOUNDS AND THE SALT COMPLEXES THEREOF
Gerard van Koten, Utrecht, and André J. Leusink, Leusden Zuid, Netherlands, assignors to International Copper Research Association, New York, N.Y.
No Drawing. Filed June 14, 1971, Ser. No. 152,990
Claims priority, application Netherlands, July 2, 1970, 7009840
Int. Cl. C07f 7/22
U.S. Cl. 260—429.7          23 Claims

ABSTRACT OF THE DISCLOSURE

This invention relates to arylcopper compounds having the general formula $$CuY_pAr[(CH_2)_nX]_m$$

wherein Y represents a halogen atom or an alkyl, alkoxy, aryl or aryloxy radical, p is a number from 0 to 2, Ar is an aryl radical, n is a number from 0 to 6, X represents the radical ZRR', OR or SO$_2$NRR' in which Z is an atom taken from Group V of the Periodic Table of the Elements and R and R' each is an alkyl, aralkyl, cycloalkyl or aryl radical and m is a number from 1 to 3 and the salt complexes thereof.

The arylcopper compounds and salts thereof of this invention have numerous uses as chemical intermediates. For example, the presence of the stable copper-carbon bond permits the compounds to undergo exchange type reactions wherein the copper atom is replaced by various organo groups. In addition, the oxidation and/or pyrolysis of the arylcopper compounds of this invention results in symmetrical biarylic compounds which are useful in the preparation of various known synthetic dyestuffs.

The arylcopper compounds and salt complexes thereof of this invention are also useful as toxins against various pest organisms. Particular compounds have been found to be quite selective as mollusicicides and algicides and may advantageously be formulated as the active ingredient in anti-fouling paints, particularly marine paints and in petroleum products to prevent microbial contamination and degradation of the same. The metal salt complexes in which the stability of the copper-carbon bond is enhanced as well as the arylcopper compounds per se, have been found to be effective catalysts in various types of chemical reactions including oxidation reactions and as catalysts for oligomerization and polymerization of unsaturated monomers such as the olefins.

SUMMARY OF THE INVENTION

Arylcopper compounds having the general formula $$CuY_pAr[(CH_2)_nX]_m$$

wherein Y represents a halogen atom or an alkyl, alkoxy, aryl or aryloxy radical, p is a number from 0 to 2, Ar is an aryl radical, n is a number from 0 to 6, X represents the radical ZRR', OR or SO$_2$NRR' in which Z is an atom taken from Group V of the Periodic Table of the Elements and R and R' each is an alkyl, aralkyl, cycloalkyl or aryl radical and m is a number from 1 to 3 are prepared by reacting a compound of the formula $$Y_pAr[(CH_2)_nX]_m$$

wherein Y, p, Ar, n, X and m have the same meaning as designated above with a metallic reactant such as an alkali metal alkyl, an alkali metal or an alkaline earth metal and reacting the resulting metal substituted intermediate with a copper salt to replace the metal substituent of the inermediate with copper.

The arylcopper compounds of this invention may be complexed with an organic or inorganic salt.

DETAILED DESCRIPTION OF THE INVENTION

The arylcopper compounds of this invention are represented by the general formula $$CuY_pAr[(CH_2)_nX]_m$$

wherein Y represents a halogen atom or an R, OR, Ar or OAr radical in which R is an alkyl, cycloalkyl, aryl, aralkyl or alkaryl radical of from 1 to about 15 carbon atoms and Ar is an aryl radical, p is a number from 0 to 2, Ar is an aryl radical, n is a number from 0 to 6, X represents a ZRR', OR or SO$_2$NRR' radical in which R and R' each is an alkyl, cycloalkyl, aryl, aralkyl or alkaryl radical of from 1 to about 15 carbon atoms and m is a number from 1 to 3.

The Ar or aryl radicals of the compounds of this invention represent an aromatic nucleus derived from such aromatic hydrocarbons as benzene, naphthalene, anthracene or phenanthrene. Advantageously, the aryl radical may be a phenyl or naphthyl radical. The R and R' radicals are advantageously alkyl, cycloalkyl, aryl, aralkyl or alkaryl radicals of 1 to about 10 carbon atoms, for example, methyl, ethyl, isobutyl, octyl, phenyl, cyclohexyl, tolyl, xylyl, benzyl or phenylethyl.

The invention, however, does not include the aryl copper compounds wherein p is 0, Ar is a phenyl radical, n is 0, X is a methoxy radical and m is 1 or 2. The excluded compounds, therefore, have the formulas:

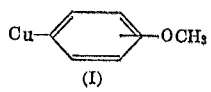   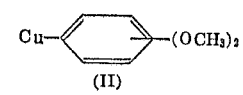
(I)                    (II)

The arylcopper compound identified as (I) was found to be explosive; the arylcopper compound identified as (II) was found to be insoluble in such commonly used organic solvents as hydrocarbons, ethers, alcohols and halogenated hydrocarbons.

With the exception of the above-noted compounds, the arylcopper compounds and organic or inorganic salt complexes thereof of this invention are soluble in one or more commonly used organic solvents such as those solvents recited above and the copper to carbon bond (Cu-C) of these arylcopper compounds is quite stable.

The arylcopper compounds and salts thereof of this invention have numerous uses as chemical intermediates. For example, the presence of the stable copper-carbon bond permits the compounds to undergo exchange type reactions wherein the copper atom is replaced by various organo groups. In addition, the oxidation and/or pyrolysis of the arylcopper compounds of this invention results in symmetrical biarylic compounds which are useful in the preparation of various known synthetic dyestuffs.

The arylcopper compounds and salt complexes thereof of this invention are also useful as toxins against various pest organisms. Particular compounds have been found to be quite selective as molluscicides and algicides and may advantageously be formulated as the active ingredient in anti-fouling paints, particularly marine paints and in petroleum products to prevent microbial contamination and degradation of the same. The metal salt complexes in which the stability of the copper-carbon bond is enhanced as well as the arylcopper compounds per se, have been found to be effective catalysts in various types of chemical reactions including oxidation reactions and as catalysts for oligomerization and polymerization of unsaturated monomers such as the olefins.

The arylcopper compounds of this invention are prepared by reacting a non-metalized compound of the formula $$Y_pAr[(CH_2)_nX]_m$$

wherein Y, p, n, X and m have the same meaning as designated above, with a metallic reactant to replace one of the substituents of the aryl moiety with a metal atom. These metallic reactants are alkali metal alkyls such as butyllithium, alkali metals such as lithium or alkaline earth metals such as magnesium. The metal substituted intermediate is then subjected to a metathetic reaction with a copper salt, such as a copper halide, to replace the alkali or alkaline earth metal substituent with copper.

The non-metalized starting materials are generally well known materials, either commercially available or prepared by known synthetic routes.

For example, various benzylamines may be prepared by the reaction of secondary amines such as dialkylamines with benzylhalides. Others may be prepared by the reaction of N,N-dialkylbenzamides with lithium aluminum hydride in ether. Another synthetic method is disclosed by Hauser, J. Org. Chem., 32, 1479 (1967). The corresponding benzylphosphines, -arsines, -stibines and -bismuthines can be prepared by analogous synthetic procedures. In addition, various aniline derivatives useful in the preparation of the arylcopper compounds of this invention are prepared by alkylation of the amino group of an aniline derivative or by alkylation combined with a ring substitution reaction such as a halogenation reaction. Phenolic ether compounds useful as starting materials for the arylcopper compounds of this invention may be prepared by conventional etherification of phenols. Numerous etherified phenols are also commercially available. The phosphines and other Group V element-containing starting reactants are normally prepared by reacting phosphine (PH₃) or analogous starting materials with an alkyl, aralkyl, cycloalkyl or aryl radical to replace the hydrogen with essentially hydrocarbyl groups. These preparative methods are conventional and well recognized. The sulfamides are normally prepared by reacting amines with sulfonyl halides, particularly sulfonyl chlorides. To prepare the sulfonamide starting materials used in preparing the arylcopper compounds of this invention, a sulfonic acid is normally reacted with phosphorus pentachloride or thionyl chloride to form the sulfonyl chloride which in turn is reacted with the appropriate amine to form the desired sulfonamide starting material.

From this discussion, it is clear that the unmetalized starting materials are either available commercially or are prepared from commercially available reagents by conventional synthetic methods.

Advantageously, two methods of preparing a metalized intermediate from these starting materials are available. In the first, the starting material is mixed with butyllithium at room temperature to form a lithium substituted aryl compound. In the second, a bromine-substituted starting material is heated with magnesium turnings in solution, such as with tetrahydrofuran, and then warmed, for example, to about 50° C., for about one hour or more. The products formed by these procedures may be used to produce the arylcopper compounds of this invention by metathesis. Alternatively, bromo derivatives might be reacted with metallic lithium or butyllithium whereby the corresponding lithio compound would be prepared. The first alternative method is outlined by Gilman et al., Journal of Organic Chemistry, 15, 994 (1950).

These lithium or magnesium derivatives are then subjected to a metathetical reaction with a copper salt, advantageously a copper halide. The metathesis of copper with lithium or magnesium occurs quite rapidly by reaction at ambient conditions. Therefore, particular reaction parameters are not required to provide for the exchange as the exchange occurs readily by the mere mixture of the lithium or magnesium intermediate with a copper salt, particularly a copper halide.

The metal and non-metallic salt complexes of the arylcopper compounds of this invention may be formed either during the metathesis or by addition of a metal or non-metallic salt such as a phosphorous-containing salt to the arylcopper compounds of the formula $$CuY_pAr[(CH_2)_nX]_m$$

wherein Y represents a halogen atom or an alkyl, alkoxy, aryl or aryloxy radical, p is a number from 0 to 2, Ar is an aryl radical, n is a number from 0 to 6, X represents the radical ZRR', OR or SO₂NRR' in which Z is an atom taken from Group V of the Periodic Table of the Elements and R and R' each is an alkyl, aralkyl, cycloalkyl or aryl radical and m is a number from 1 to 3. The complexed salts may be present in amounts of from about 0.1 to about 3 moles of salt per mole of arylcopper compounds. The metal salts are usually the halides of metals such as copper, magnesium or tin.

The following illustrative examples result in the production of various arylcopper compounds and metal salt complexes thereof within the scope of this invention. The numbering system of the positions in the aryl ring is based on [(CH₂)ₙX] group being in the 1-position. All of the synthesis are normally carried out in an inert nitrogen atmosphere.

EXAMPLE 1

A solution of 60 mmoles of benzyldimethylamine and 60 mmoles of butyllithium in ether (150 ml.) was stirred for 16 hours at room temperature. The resulting yellow suspension of (2-lithiobenzyl)dimethylamine was cooled to −20° and subsequently 60 mmoles of cuprous bromide were added. After 1 hour the mixture was warmed up to room temperature and stirred for an additional hour. During the addition of cuprous bromide both metallic copper and yellow insoluble (2-cupriobenzyl)dimethylamine separated from the solution. Prior to filtration of these solids the mixture was cooled to −20°. The solid obtained was washed with cold ether until a test for bromide ions from LiBr in the filtrate was negative. The residue was dried in vacuum and subsequently extracted with ether. From this extract, pure yellow (2-cupriobenzyl) dimethylamine of the formula

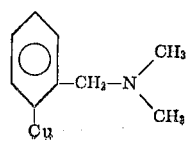

was obtained in 50% yield. Found (percent): C, 54.8; H, 6.3; Cu, 31.6; N, 7.0; C₉H₁₂CuN calculated (percent): C, 54.66; H, 6.11; Cu, 32.13; N, 7.08; D.T. (decomposion temperature) 170–180° C.

EXAMPLE 2

A solution of 30 mmoles of (2-lithiobenzyl)dimethylamine was added at —20° to a well-stirred suspension of cuprous bromide. In contrast to the reaction described in Example 1, a black-brown solid precipitated from the reaction mixture. The resulting mixture was stirred for 1 hour at —20°. Brown solids were isolated by filtration. From these products pure (2-cupriobenzyl)dimethylamine was not isolated. IR spectroscopy of the products indicated that complexes of cuprous bromide and (2-cupriobenzyl)dimethylamine of the formula

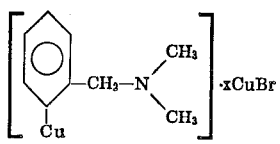

were present.

EXAMPLE 3

Solid cupric bromide (15 mmoles) was added slowly at —40° to a suspension of (2-lithiobenzyl) dimethylamine (30 mmoles) in ether (100 ml.). This mixture was stirred for 4 hours at —40°. During the reaction (2-cupriobenzyl)dimethylamine precipitated. The reaction mixture was worked up essentially as described above in Example 1 for the reaction with cuprous bromide. Yellow (2-cupriobenzyl)dimethylamine having the formula

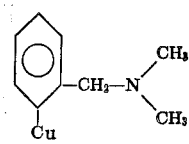

was obtained in 47% yield (based on the amount of cupric bromide reacted). Found (percent): Cu, 31.8; C₉H₁₂CuN calculated (percent): Cu, 32.13.

EXAMPLE 4

Solid anhydrous cupric chloride (15 mmoles) was added slowly at —40° to a suspension of (2-lithiobenzyl) dimethylamine (30 mmoles) in ether (100 ml.). The reaction mixture was stirred for 2½ hours at —20°. From this reaction two insoluble complexes of cuprous chloride with (2-cupriobenzyl)dimethylamine, and two fractions of cuprate complex soluble in ether, pentane and benzene were obtained. The copper analysis of these fractions were in accord with a 2/1 complex 2RCu·RLi. Found (percent): Cu, 22.7 and 23.4 respectively;

C₂₇H₃₆N₃Cu₂Li(2RCu·RLi)

calculated (percent): Cu, 23.6.

EXAMPLE 5

A solution of 20 mmoles of (4-methylbenzyl)dimethylamine was added to a solution of 20 mmoles of butyllithium in ether (100 ml.). The solution was stirred at room temperature for 66 hours. The resulting mixture was cooled to —20° and subsequently 20 mmoles of cuprous bromide were added. The reaction mixture was stirred at —20° for 2 hours. The resulting mixture was warmed up to room temperature. Very poorly soluble, yellow (2-cuprio-4-methylbenzyl)dimethylamine and some metallic copper were filtered off. The precipitate was washed with ether and dried in high vacuum. The crude product was extracted with benzene. From the benzene extract yellow (2-cuprio-4-methylbenzyl)dimethylamine of the formula

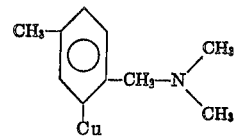

was obtained in 61% yield. Found (percent): C, 56.5; H, 6.7; Cu, 29.8; N, 6.4; C₁₀H₁₄CuN calculated (percent): C, 56.72; H, 6.66; Cu, 30.04; N, 6.61; D.T.: 175–205° C.

EXAMPLE 6

Solid cuprous bromide (20 mmoles) was added at —20° to a yellow suspension of (2-lithio-4-methoxybenzyl)dimethylamine (20 mmoles). This mixture was stirred for 2 hours at —20° and subsequently worked up as described for the synthesis of (2-cuprio-4-methylbenzyl)dimethylamine. A compound of the formula

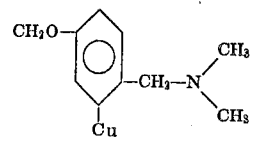

[(2 - cuprio-4-methoxybenzyl)dimethylamine)] was obtained in 40% yield after recrystallization from benzene. Found (percent): C, 53.1; H, 6.2; Cu, 27.2; N, 6.1; C₁₀H₁₄CuNO calculated (percent): C, 52.73; H, 6.20; Cu, 27.90; N, 6.15; D.T.: 175–180° C.

EXAMPLE 7

Solid cuprous bromide (20 mmoles) was added at —20° to a yellow suspension of (2-lithio-4-chlorobenzyl) dimethylamine (20 mmoles). After stirring at —20° for two hours, the reaction mixture was worked up as described for the isolation of (2-cuprio-4-methylbenzyl) dimethylamine. Yellow (2-cuprio-4-chlorobenzyl)dimethylamine of the formula

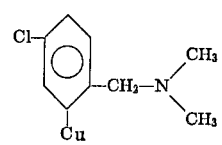

was obtained in 40% yield (after recrystallization from benzene). Found (percent): C, 46.4; H, 4.5; Cl, 15.3; Cu, 27.2; N, 5.8; C₉H₁₁ClCuN calculated (percent): C, 46.56; H, 4.78; Cl, 15.27; Cu, 27.37; N, 6.03; D.T.: 140–145° C.

EXAMPLE 8

Solid cuprous bromide (20 mmoles) was added at —20° to a red-colored solution of (2-lithio-6-chlorobenzyl)dimethylamine (20 mmoles). During the reaction metallic copper separated. After stirring at —20° for an additional hour yellow (2-cuprio-6-chlorobenzyl)dimethylamine precipitated. The solids formed were filtered off and subsequently washed with cold ether (removal of LiBr). The residue was extracted with benzene. Yellow (2-cuprio-6-chlorobenzyl)dimethylamine of the formula

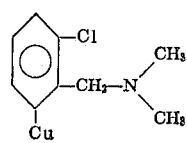

was obtained in 50% yield (after recrystallization from benzene/pentane mixture). Found (percent): C, 46.5; H, 4.6; Cl, 15.3; Cu, 27.2; N, 5.9; $C_9H_{11}ClCuN$ calculated (percent): C, 46.56; H, 4.78; Cl, 15.27; Cu, 27.37; N, 6.03; D.T.: 120–130° C.

EXAMPLE 9

A solution of 2-lithio-N,N-dimethylaniline (19 mmoles) in ether was added at −20° to a suspension of cuprous bromide (19 mmoles) in ether (40 ml.). This mixture was stirred at −20° for 3 hours, warmed up to room temperature and subsequently stirred for an additional 19 hours. The resulting precipitate was filtered off. The insoluble residue was washed with ether, benzene and pentane, respectively. Cream colored 2-cuprio-N,N-dimethylaniline of the formula

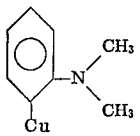

was obtained in 72% yield. Found (percent): C, 51.6; H, 5.4; Cu, 33.4; N, 7.2; $C_8H_{10}CuN$ calculated (percent): C, 52.30; H, 5.49; Cu, 34.59; N, 7.62. From the benzene extract bis(2 - cuprio-N,N-dimethylaniline)cuprous bromide of the formula

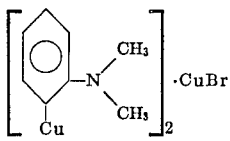

was isolated in 20% yield. D.T.: 202–210° C.

EXAMPLE 10

Solid cuprous bromide (20 mmoles) was added at −20° to a suspension of N,N-dimethyl-2-lithiobenzenesulfonamide (20 mmoles) in ether (60 ml.). The resulting suspension was stirred at −20° for 1 hour and subsequently 1 hour at room temperature. The precipitate was filtered off. After recrystallization of the resulting solid from benzene and ether respectively, almost white N,N-dimethyl-2-cupriobenzenesulfonamide having the formula

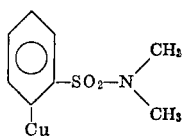

was obtained in 70% yield. Found (percent): C, 21.5; H, 2.1; Cu, 25.5; N, 5.6; $C_8H_{10}CuNO_2S$ calculated (percent): C, 21.86; H, 2.28; Cu, 25.68; N, 5.66; D.T.: 168–175° C.

EXAMPLE 11

Solid cuprous bromide (15 mmoles) was added at −20° to a solution of 2-lithio-1,3-bis(methoxymethyl) benzene (15 mmoles) in ether (75 ml.). This mixture was stirred at room temperature for 16 hours. Working-up as usual afforded white 2 - cuprio-1,3-bis(methoxymethyl) benzene of the formula

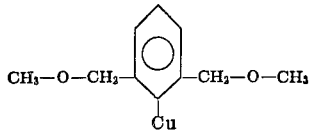

in 60% yield after recrystallization from benzene and ether. Found (percent): C, 52.0; H, 5.5; Cu, 27.5; $C_{10}H_{13}CuO_2$ calculated (percent): C, 52.40; H, 5.67; Cu, 27.80; D.T.: 170–174° C.

EXAMPLE 12

A solution of (4-lithiophenyl)diphenylphosphine (20 mmoles) was added at 0° to a suspension of cuprous bromide (20 mmoles) in ether (25 ml.). The resulting suspension was stirred at room temperature for 2 hours. The precipitate isolated by filtration was washed with ether. Unreacted cuprous bromide present in the solid was removed by extraction with a solution of triphenylphosphine in ether. Almost white (4-cupriophenyl)diphenylphosphine of the formula

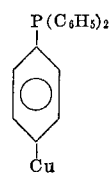

was obtained in 50% yield. Found (percent): C, 66.3; H, 4.2; Cu, 19.1; P, 9.4; $C_{18}H_{14}CuP$ calculated (percent): C, 66.57; H, 4.35; Cu, 19.56; P, 9.54; D.T.: >150° C.

EXAMPLE 13

Solid cuprous bromide (19.5 mmoles) was added at −20° to a solution of 19.5 mmoles of 2-lithio-1,3,5-trimethoxybenzene [obtained from the reaction of 1,3,5-trimethoxybenzene (19.5 mmoles with butyllithium (19.5 mmoles) at room temperature for 72 hours]. During the reaction 2-cuprio-1,3,5-trimethoxybenzene separated from the reaction mixture. The solid was filtered off and recrystallized from benzene. White 2-cuprio-1,3,5-trimethoxybenzene containing some benzene (7 weight percent having the formula

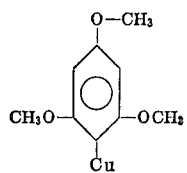

was obtained in 80% yield. Found (percent): C, 48.4; H, 5.1; Cu, 25.6; $C_9H_{11}CuO_3$ calculated (percent): C, 46.85; H, 4.81; Cu, 27.54; D.T.: 198–202° C.

EXAMPLE 14

A solution of 20 mmoles of 2-lithio-N,N-dimethylaniline was added at −20° to a suspension of cuprous bromide (40 mmoles) in ether (40 ml.). An immediate formation of a red solid was observed. This mixture was stirred for 0.5 hour at −20° and for an additional 2 hours at room temperature. The precipitate was filtered off and subsequently extracted with ether until a test on the presence of bromide was negative. The residue was extracted with benzene. From this extract bright red crystals of bis(2-cuprio-N,N-dimethylaniline)-cuprous bromide of the formula

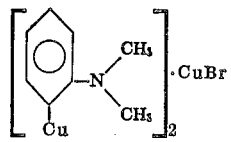

was obtained in 75% yield. Found (percent): C, 37.5; H, 4.0; Br, 15.6; Cu, 37.2; N, 5.74; $2(C_8H_{10}CuN)\cdot CuBr$ calculated (percent): C, 37.62; H, 3.95; Br, 15.64; Cu, 37.31; N, 5.48.

Bis(2 - cuprio-N,N-dimethylaniline)-cuprous bromide can also be prepared via the reaction of 2-cuprio-N,N-dimethylaniline with cuprous bromide.

Some additional aryl copper compounds and metal salt complexes thereof prepared are listed in Tables I and II.

TABLE I

| Compound | Structure | Example | Decomposition temperature, °C. |
|---|---|---|---|
| 2-cuprio-N,N-dimethylaniline | | 9 | 202–210 |
| 3-cuprio-N,N-dimethylaniline | | | 0 |
| 4-cuprio-N,N-dimethylaniline | | | >100 |
| (2-cupriobenzyl)dimethylamine | | 1, 3, 17, 20 | 170–180 |
| (2-cuprio-3-methoxybenzyl)-dimethylamine | | | 130–135 |
| (2-cuprio-4-methoxybenzyl)-dimethylamine | | 6 | 175–180 |
| (2-cuprio-5-methoxybenzyl)-dimethylamine | | | 140–145 |
| (2-cuprio-4-chlorobenzyl)-dimethylamine | | 7 | 140–145 |
| (2-cuprio-6-chlorobenzyl)-dimethylamine | | 8 | 120–130 |

TABLE I—Continued

| Compound | Structure | Example | Decomposition temperature, °C. |
|---|---|---|---|
| (2-cuprio-3-methylbenzyl)-dimethylamine | | | 100–105 |
| (2-cuprio-4-methylbenzyl)-dimethylamine | | 5 | 175–205 |
| (2-cuprio-3,5-dimethylbenzyl)dimethylamine | | | 70–80 |
| 2-cuprio-1,3-bis[(dimethylamino)-methyl]benzene | | | >130 |
| 2-cuprio-N,N-dimethylbenzenesulfonamide | | 10 | 168–175 |
| 4-methoxy-8-cuprio-1-[(dimethylamin)-methyl]-naphthalene | | | 162–165 |
| (2-cupriobenzyl)-N-benzyl-N-methylamine | | | 25 |
| (4-cupriophenyl)-diphenylphosphine | | 12 | >150 |
| 2-cuprio-1,3,5-trimethoxybenzene | | 13, 15, 16, 19 | 198–202 |
| 2-cuprio-1,3-bis-(methoxymethyl)-benzene | | 11 | 170–174 |

TABLE II

| Compound | Structure | Example | Decomposition temperature, °C. |
|---|---|---|---|
| 4-cuprio-N,N-dimethylanilinecuprous bromide | [structure: N,N-dimethylaniline with Cu at 4-position] ·xCuBr, 0<x<1 | 18 | 175 |
| Bis(2-cuprio-N,N-dimethylaniline)-cuprous bromide | [structure with 2-Cu substituted N,N-dimethylaniline]₂ · CuBr | 9, 14 | --- |
| (2-cupriobenzyl)-dimethylamine-2 MgBr₂ | [structure: 2-Cu-benzyl-CH₂-N(CH₃)₂] ·xMgBr₂, x=½, 2 | --- | 135–140 |
| (2-cuprio-benzyl)dimethylamine-CuBr | [structure: 2-Cu-benzyl-CH₂-N(CH₃)₂] ·CuBr | 2 | --- |
| (2-cupriobenzyl)dimethylamine-SnBr₂ | [structure: 2-Cu-benzyl-CH₂-N(CH₃)₂] ·SnBr₂ | --- | 125–138 |
| Tris(2-cuprio-1,3-dimethoxybenzene)triphenylphosphine | [structure: 1,3-dimethoxybenzene with Cu at 2-position] ·xP(C₆H₅)₃, 0<x<1 | --- | 134–136 |
| 2-cuprio-1,3-dimethoxybenzene-CuBr | [structure: 1,3-dimethoxybenzene with Cu at 2-position] ·xCuHal, 0<X<1, Hal=Cl, Br, Cl₂, Br₂ | --- | 185–186 |

The arylcopper compounds according to the invention may be used, as previously indicated, as intermediates for further syntheses, especially for the introduction of a substituted aryl group R″ at a so-called sp, sp² or sp³-carbon in the compounds R‴ Hal, wherein R‴ represents an organic radical and Hal a halogen atom. For the meaning of sp, sp² and sp³, reference is made to the Journal of the American Chemical Society, 90, pp. 5615 and 5616 (1968). Examples are:

sp-carbon: R—C≡C—Hal;
sp²-carbon: R₂C=CH—Hal; C₆H₅—Hal, R—CO—Hal;
sp³-carbon: R₃C—Hal;

R as used here has the meaning as defined previously above, or is H. This introduction of a substituted aryl group can be effected for instance by reacting an arylcopper compound according to the invention with a carboxylic acid halide in the liquid phase. In particular, various benzophenones are thus prepared. These benzophenones are excellent intermediates for producing dyestuffs, U.V.-light absorbers, pharmaceutical and veterinary products and pesticides. The following are additional examples directed to the use of arylcopper compounds of this invention as chemical intermediates.

EXAMPLE 15

A solution of 11 mmoles acetyl chloride in benzene (20 ml.) was added gradually to a suspension of 2-cuprio-1,3,5-trimethoxybenzene (10 mmoles) in benzene (50 ml.) at 5° C. The yellow green mixture was stirred for 24 hours at 20° C. During the reaction a white precipitate was formed. The mixture thus obtained was hydrolized with a few milliliters of water, after which the mixture was neutralized with 4 N NaOH. The precipitate was filtered off. The benzene-water layers were separated, and the benzene layer was dried over solid Na₂SO₄. White crystalline 2,4,6-trimethoxyacetophenone was obtained in an 87% yield. Its structure was confirmed by means of NMR and IR spectroscopy. M.P. 102–102.5° (reported M.P. 100° C.).

EXAMPLE 16

In a similar manner as described in Example 15 using 4-nitrobenzoyl chloride as a reactant, yellow crystals of 4′-nitro-2,4,6-trimethoxybenzophenone were isolated in a 75% yield. M.P. 171–172° C.

EXAMPLE 17

To a solution of 5 mmoles of benzoyl chloride in benzene (20 ml.) was added slowly a solution of 5 mmoles of (2-cupriobenzyl)dimethylamine in benzene (30 ml.). This mixture was stirred for 24 hours at room temperature. The mixture was hydrolized with water and subsequently neutralized with 4 N NaOH. The benzene layer was separated and washed with an aqueous 10% HCl solution. The water layer was made alkaline with solid NaOH and subsequently treated with ether. The ether was dried over solid $Na_2SO_4$ and evaporated after which crystals of 2 - [(dimethylamino)methyl]benzophenone were obtained (yield 80%). This structure was confirmed by NMR and IR spectroscopy. M.P. 43.5–45.5°; reported M.P. 43–46° C.

EXAMPLE 18

To a suspension of 4 - cuprio-N,N-dimethylanilinecuprous bromide in benzene (40 ml.) a solution of 4-nitrobenzoyl chloride in benzene (20 ml.) was added slowly. After stirring for 36 hours at ambient temperature, the suspension was decomposed with water. From the benzene layer 4 - (dimethylamino)-4'-nitrobenzophenone was obtained in 85% yield. M.P. 208–209° C.

EXAMPLE 19

A solution of allyl bromide (12 mmoles) in benzene (10 ml.) was added at 0° to a suspension of 2-cuprio-1,3,5-trimethoxybenzene (11.5 moles) in benzene. This mixture was stirred at room temperature for 48 hours. The precipitate was filtered off, and the filtrate was washed with aqueous ammonia and water. The benzene layer was dried over potassium carbonate and subsequently concentrated at low pressure. From the resulting yellow oil, 2-allyl-1,3,5-trimethoxybenzene (according to NMR spectroscopy) was obtained in 75% yield after purification by distillation. B.P. 85–86°/0.1 mm.; $n_D^{20}$ 1.5302.

The arylcopper compounds of this invention can also be oxidized or pyrolized to form diaryl compounds. The following is an example wherein oxidation of an arylcopper compound of this invention in air results in the preparation of a diaryl compound.

EXAMPLE 20

Dry air was bubbled through a solution of (2-cupriobenzyl)dimethylamine (6 mmoles) in benzene (40 ml.) during 4 hours. The resulting reaction mixture was extracted with an aqueous solution of ammonium hydroxide. The benzene layer was extracted with a 4 N solution of hydrochloric acid. Thhe acidic aqueous layer was made basic with solid sodium hydroxide and subsequently extracted with ether. From the ethereal layer 2,2'-bis[(dimethylamino)methyl)]biphenyl was obtained in 75% yield by recrystallization from pentane. M.P. 34–36.5°.

It is not always necessary to isolate the aryl copper compounds of this invention when they are to be used for further synthesis as is obvious to those skilled in the art.

We claim:

1. Arylcopper compounds having the general formula $$CuY_pAr[(CH_2)_nX]_m$$

wherein Y is bonded to Ar and represents a halogen atom or an alkyl, alkoxy, aryl or aryloxy radical wherein Cu is directly bonded, p is a number from 0 to 2, Ar is an aryl radical, n is a number from 0 to 6, X represents the radical ZRR', OR or $SO_2NRR'$ in which Z is a nitrogen or phosphorus atom and R and R' each is an alkyl, aralkyl, cycloalkyl or aryl radical and m is a number from 1 to 3 but when p is 0, Ar is a phenyl radical, n is 0 and X is a methoxy radical, m is 3.

2. An arylcopper compound according to claim 1 wherein Ar is a phenyl or naphthyl radical, m is 1 or 2, n is 1 and X is the radical ZRR' or OR.

3. An arylcopper compound according to claim 2 having the formula

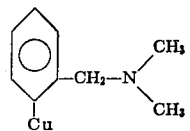

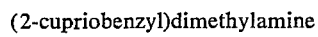

(2-cupriobenzyl)dimethylamine

4. An arylcopper compound according to claim 2 having the formula

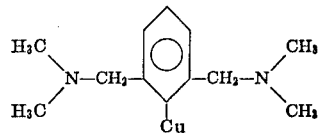

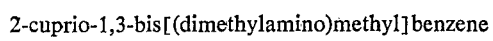

2-cuprio-1,3-bis[(dimethylamino)methyl]benzene

5. An arylcopper compound according to claim 2 having the formula

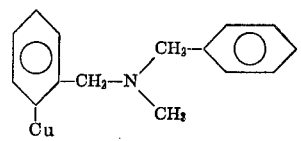

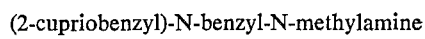

(2-cupriobenzyl)-N-benzyl-N-methylamine

6. An arylcopper compound according to claim 2 having the formula

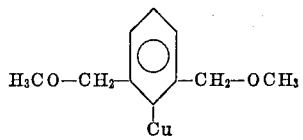

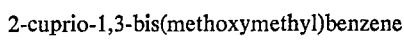

2-cuprio-1,3-bis(methoxymethyl)benzene

7. An arylcopper compound according to claim 2 wherein Y is a chlorine atom, a methyl radical or a methoxy radical occupying the 3, 4 or 5-position on the phenyl radical.

8. An arylcopper compound according to claim 7 having the formula

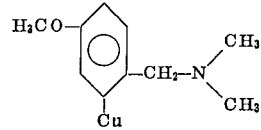

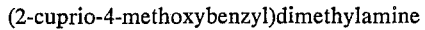

(2-cuprio-4-methoxybenzyl)dimethylamine

9. An arylcopper compound according to claim 7 having the formula

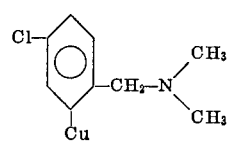

(2-cuprio-4-chlorobenzyl)dimethylamine

10. An arylcopper compound according to claim 7 having the formula

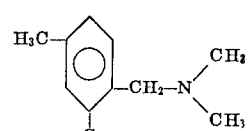

(2-cuprio-4-methylbenzyl)dimethylamine

11. An arylcopper compound according to claim 7 having the formula

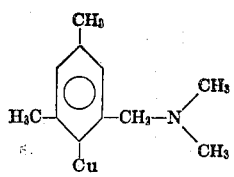

(2-cuprio-3,5-dimethylbenzyl)dimethylamine

12. An arylcopper compound according to claim 7 having the formula

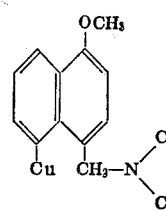

4-methoxy-8-cuprio-1-[(dimethylamino)methyl]-naphthalene

13. An arylcopper compound according to claim 1 wherein Ar is a phenyl radical, n is 0, p is 0, X is a methoxy radical, the radical ZRR' in which Z is a nitrogen or phosphorous atom, or the radical SO$_2$NRR' occupying the 1-position on the phenyl radical with Cu occupying the 2, 3 or 4-position of the phenyl radical but where X is a methoxy radical, m is 3.

14. The arylcopper compound according to claim 13 having the formula

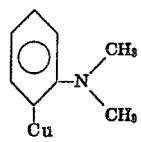

2-cuprio-N,N-dimethylaniline

15. An arylcopper compound according to claim 13 having the formula

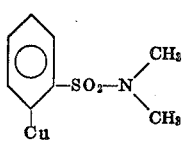

N,N-dimethyl-2-cupriobenzenesulfonamide

16. An arylcopper compound according to claim 13, having the formula

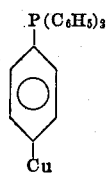

(4-cupriophenyl)diphenylphosphine

17. An arylcopper compound according to claim 13 having the formula

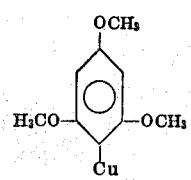

2-cuprio-1,3,5-trimethoxybenzene

18. An arylcopper salt complex according to claim 22 having the formula

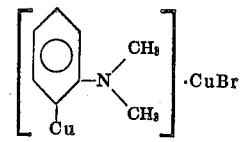

bis(2-cuprio-N,N-dimethylaniline)-cuprous bromide

19. An arylcopper salt complex according to claim 22 having the formula

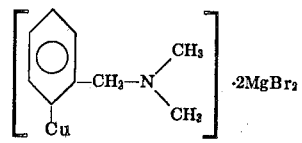

(2-cupriobenzyl)dimethylamine-2-magnesium bromide

20. An arylcopper salt complex according to claim 22 having the formula

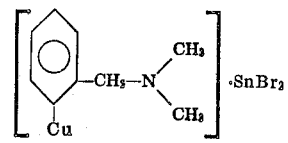

(2-cupriobenzyl)dimethylamine-stannous bromide

21. An arylcopper salt complex having the formula

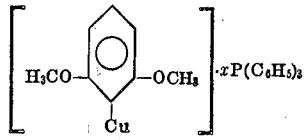

in which x has a value less than 1.

22. An arylcopper salt complex having the general formula

wherein Y is bonded to Ar and represents a halogen atom or an alkyl, alkoxy, aryl or aryloxy radical, p is a number from 0 to 2, Ar is an aryl radical to which Cu is directly bonded, n is a number from 0 to 6, X represents the radical ZRR', OR or SO$_2$—NRR' in which Z is a nitrogen or phosphorus atom and R and R' each is an alkyl, aralkyl, cycloalkyl or aryl radical, m is a number from 1 to 3 and the salt moiety is a copper, magnesium or tin halide salt present at a level of from about 0.1 to about 3 moles salt per mole of arylcopper compound.

23. The process for preparing arylcopper compounds having the general formula

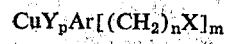

wherein Y is bonded to Ar and represents a haolgen atom or an alkyl, alkoxy, aryl or aryloxy radical, p is a number from 0 to 2, Ar is an aryl radical, wherein Cu is directly bonded, n is a number from 0 to 6, X represents the radical ZRR', OR or SO$_2$NRR' in which Z is a nitrogen or phosphorus atom and R and R' each is an alkyl, aralkyl, cycloalkyl or aryl radical and m is a number from 1 to 3 which comprises reacting a non-metallized compound having the formula

wherein Y, p, Ar, n, X and m have the same meaning as designated above with an alkali metal alkyl, an alkali metal or alkaline earth metal in order to replace one of the substituents of the Ar radical with a metal atom and reacting the resulting metal-substituted product with a copper salt capable of metathesis to replace the alkali or alkaline earth metal substituent with copper.

References Cited

Chemical Abstracts, vol. 73, 109863s (1970).
Camus et al.: J. Organometal. Chem. vol. 14, p. 441 (1968).
Chemical Abstracts, vol. 40, $4038^8$–$4039^3$ (1946).
Chemical Abstracts, vol. 37, $5703^8$.

HELEN M. S. SNEED, Primary Examiner

U.S. Cl. X.R.

71—97; 106—15; 208—15, 18; 260—41, 438.1, 591, 668; 424—294